(12) United States Patent
Held et al.

(10) Patent No.: US 7,234,753 B2
(45) Date of Patent: Jun. 26, 2007

(54) CART CANOPY SYSTEM

(76) Inventors: William T. Held, 191 Buffalo Creek Rd., Elma, NY (US) 14059; R. Kent Roberts, 43 Pino Alto Ct., Williamsville, NY (US) 14221

( * ) Notice: Subject to any disclaimer, the term of this patent is extended or adjusted under 35 U.S.C. 154(b) by 81 days.

(21) Appl. No.: 10/890,305

(22) Filed: Jul. 13, 2004

(65) Prior Publication Data

US 2005/0172988 A1    Aug. 11, 2005

Related U.S. Application Data

(60) Provisional application No. 60/582,576, filed on Jun. 23, 2004, provisional application No. 60/557,925, filed on Mar. 31, 2004, provisional application No. 60/542,727, filed on Feb. 6, 2004, provisional application No. 60/542,726, filed on Feb. 6, 2004.

(51) Int. Cl.
B60P 7/02 (2006.01)

(52) U.S. Cl. ............ 296/100.18; 296/100.11; 296/100.14; 296/100.17; 135/88.01; 135/88.07; 135/88.09; 135/88.13

(58) Field of Classification Search ........... 296/98, 296/100.14, 100.17, 100.18, 100.11; 135/87, 135/88.01, 88.05, 88.07, 88.09, 88.13, 88.14
See application file for complete search history.

(56) References Cited

U.S. PATENT DOCUMENTS

| | | | |
|---|---|---|---|
| 208,564 A | 10/1878 | Bowers | |
| 1,470,630 A | 10/1923 | Mahr | |
| 1,819,490 A | 8/1931 | Weiss | |
| 2,159,309 A | 5/1939 | Betourne | |
| 2,593,909 A | 4/1952 | Moreland | |
| 2,627,865 A | 2/1953 | Mitchell et al. | |
| 2,689,579 A | 9/1954 | Sartori | |
| 3,671,071 A | 6/1972 | Evinrude | |
| 4,008,874 A | 2/1977 | Conway, Jr. | |
| 4,013,315 A | 3/1977 | West | |
| 4,037,614 A | 7/1977 | Hines et al. | |
| 4,098,536 A | 7/1978 | Mills | |
| 4,332,415 A | 6/1982 | Williams | |
| 4,344,285 A | 8/1982 | Ridge | |
| 4,402,544 A | 9/1983 | Artim et al. | |
| 4,469,114 A | 9/1984 | Kelley et al. | |
| 4,474,388 A | 10/1984 | Wagner | |
| D287,041 S | 12/1986 | Gitchel et al. | |
| 4,641,879 A | 2/1987 | Kassai | |
| 4,748,995 A | 6/1988 | Viglione | |
| 4,830,037 A | 5/1989 | Held | |
| 4,846,524 A | 7/1989 | Gerber | |
| 4,915,120 A | 4/1990 | Ziolkowski | |
| 5,058,943 A | 10/1991 | Louderback | |
| 5,069,481 A | 12/1991 | Strange | |
| 5,072,987 A | 12/1991 | Allen | |
| 5,146,967 A | 9/1992 | Chapman | |
| 5,190,340 A | 3/1993 | Nuscher | |
| 5,217,275 A | 6/1993 | Ridge | |
| 5,259,656 A | 11/1993 | Carroll | |
| 5,388,881 A | 2/1995 | Spencer et al. | |
| D363,265 S | 10/1995 | Althoff | |
| 5,588,690 A | 12/1996 | Showalter | |

(Continued)

Primary Examiner—Lori L. Coletta
(74) Attorney, Agent, or Firm—Hodgson Russ LLP

(57) ABSTRACT

The invention may be embodied in as a canopy system for a vehicle, such as a golf cart. The invention may include nested support members and/or a housing.

32 Claims, 22 Drawing Sheets

U.S. PATENT DOCUMENTS

| | | | |
|---|---|---|---|
| 5,741,041 A | 4/1998 | Sullivan | |
| 5,788,317 A | 8/1998 | Nation | |
| 6,007,134 A | 12/1999 | Weston | |
| 6,068,325 A | 5/2000 | Hughes | |
| 6,186,584 B1 | 2/2001 | Samuelson et al. | |
| 6,199,932 B1 | 3/2001 | Welsh et al. | |
| 6,216,714 B1 | 4/2001 | Tucker | |
| 6,220,647 B1 * | 4/2001 | Winkler | 296/100.14 |
| 6,227,217 B1 | 5/2001 | Peta | |
| 6,227,603 B1 | 5/2001 | Brock | |
| 6,260,908 B1 | 7/2001 | Fraula et al. | |
| 6,276,424 B1 | 8/2001 | Frey, Jr. | |
| 6,343,613 B1 * | 2/2002 | Yasutomi | 135/88.01 |
| 6,416,109 B1 | 7/2002 | Tyrer et al. | |
| 6,439,637 B1 | 8/2002 | Tyrer | |
| 6,464,291 B2 | 10/2002 | Hynds et al. | |
| 6,471,280 B1 | 10/2002 | Fowler | |
| 6,471,281 B1 | 10/2002 | Tyrer et al. | |
| 6,494,246 B1 | 12/2002 | Blevins | |
| D469,734 S | 2/2003 | Tyrer | |
| 6,520,569 B2 | 2/2003 | Wingen et al. | |
| 6,547,304 B1 | 4/2003 | Conner et al. | |
| 6,547,312 B2 | 4/2003 | Winkler | |
| 6,561,257 B2 | 5/2003 | Huang | |
| 6,565,139 B2 | 5/2003 | Bayerle et al. | |
| D478,859 S | 8/2003 | Tyrer | |
| 6,601,904 B2 | 8/2003 | Winkler | |
| 6,619,726 B2 | 9/2003 | Jones | |
| 6,655,725 B2 | 12/2003 | Soldatelli | |
| 6,663,161 B1 | 12/2003 | Tyrer | |
| 6,663,162 B1 | 12/2003 | Tyrer | |
| 6,761,391 B2 | 7/2004 | Winkler | |
| 6,773,052 B1 * | 8/2004 | Tyrer | 296/100.11 |
| 6,979,044 B2 * | 12/2005 | Tyrer | 296/100.14 |
| 2002/0027373 A1 * | 3/2002 | Winkler | 296/100.14 |
| 2002/0083971 A1 | 7/2002 | Blount | |
| 2002/0167192 A1 | 11/2002 | Tyrer et al. | |
| 2003/0183262 A1 * | 10/2003 | Tyrer | 135/88.09 |

* cited by examiner

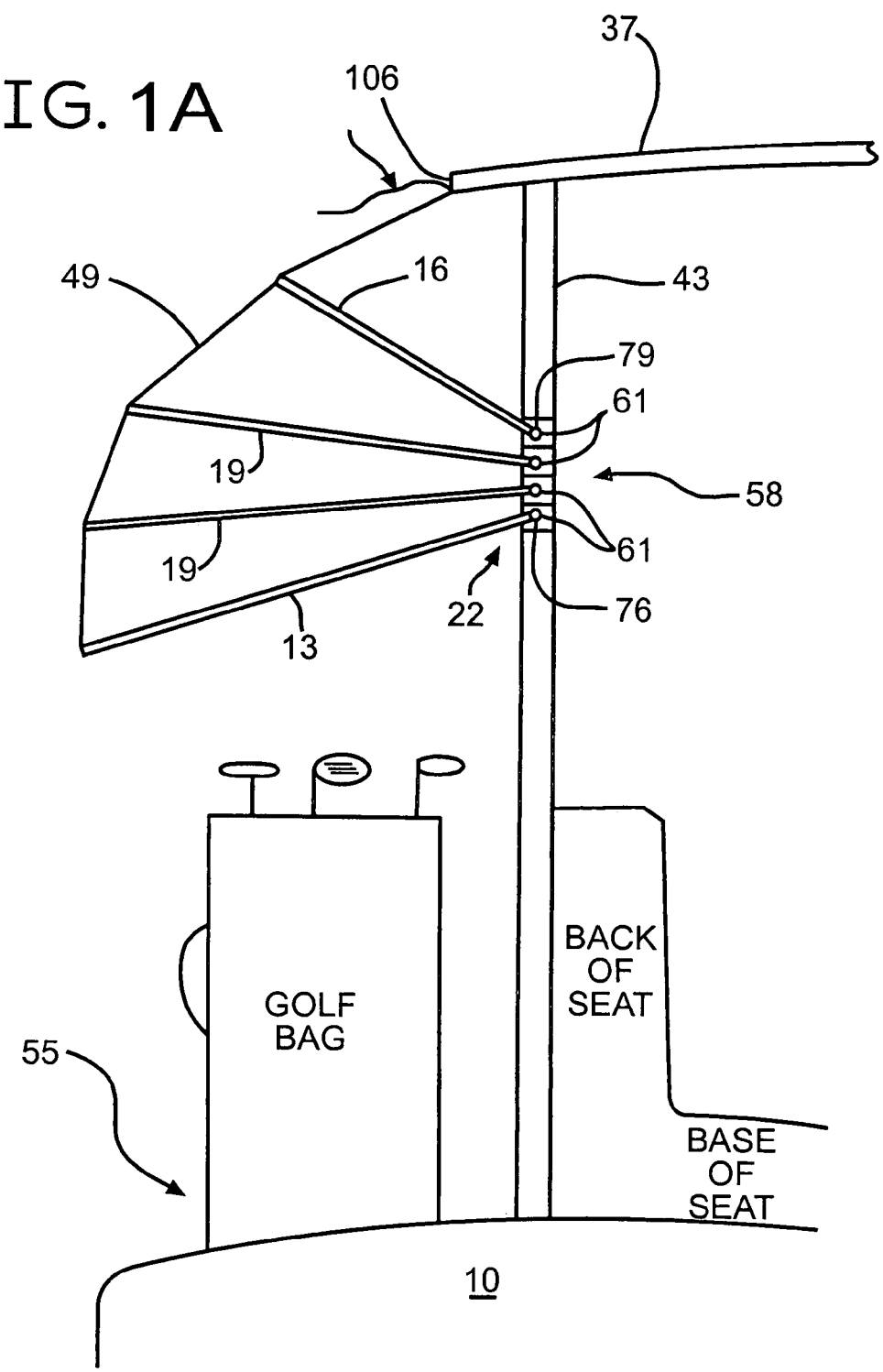

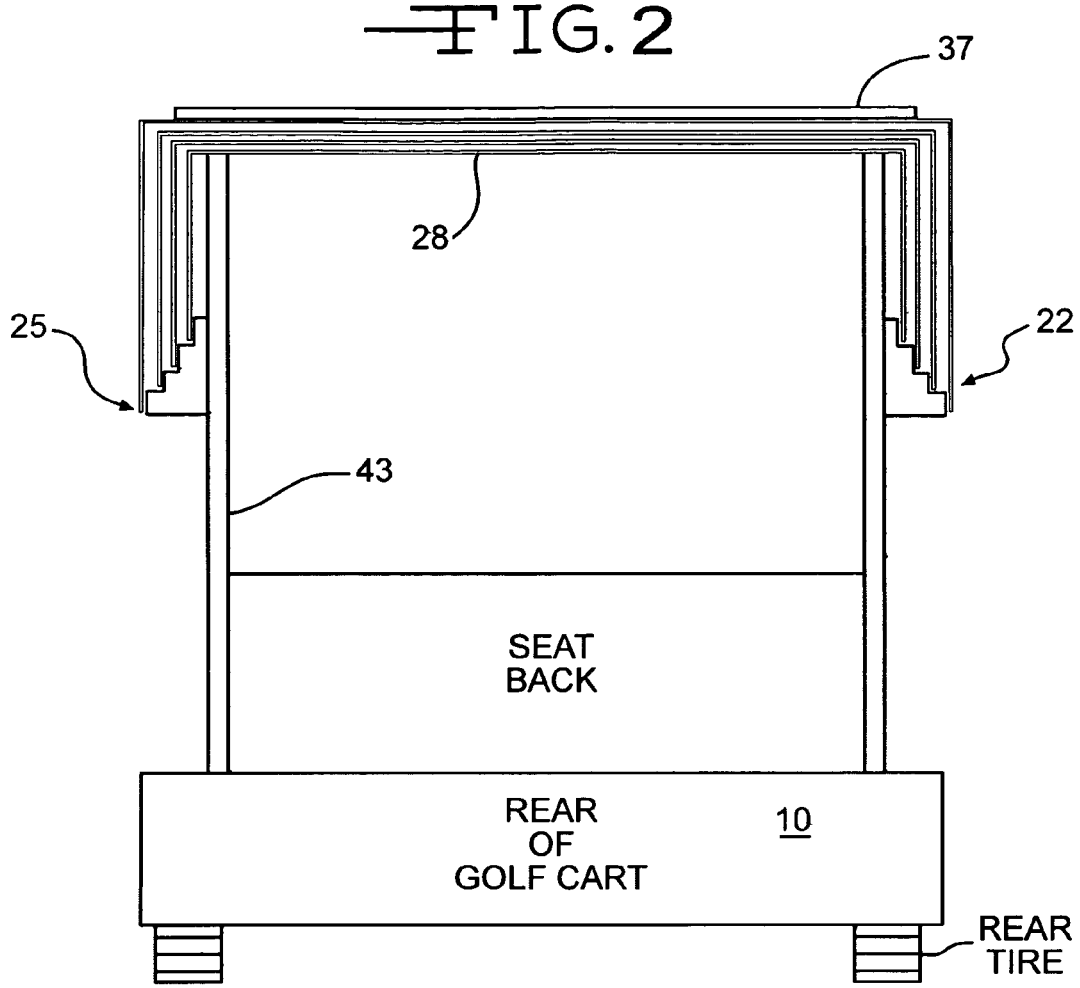
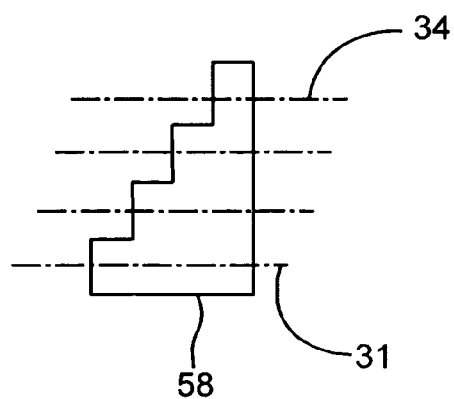
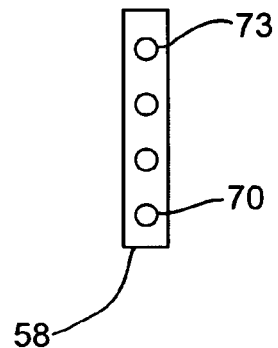

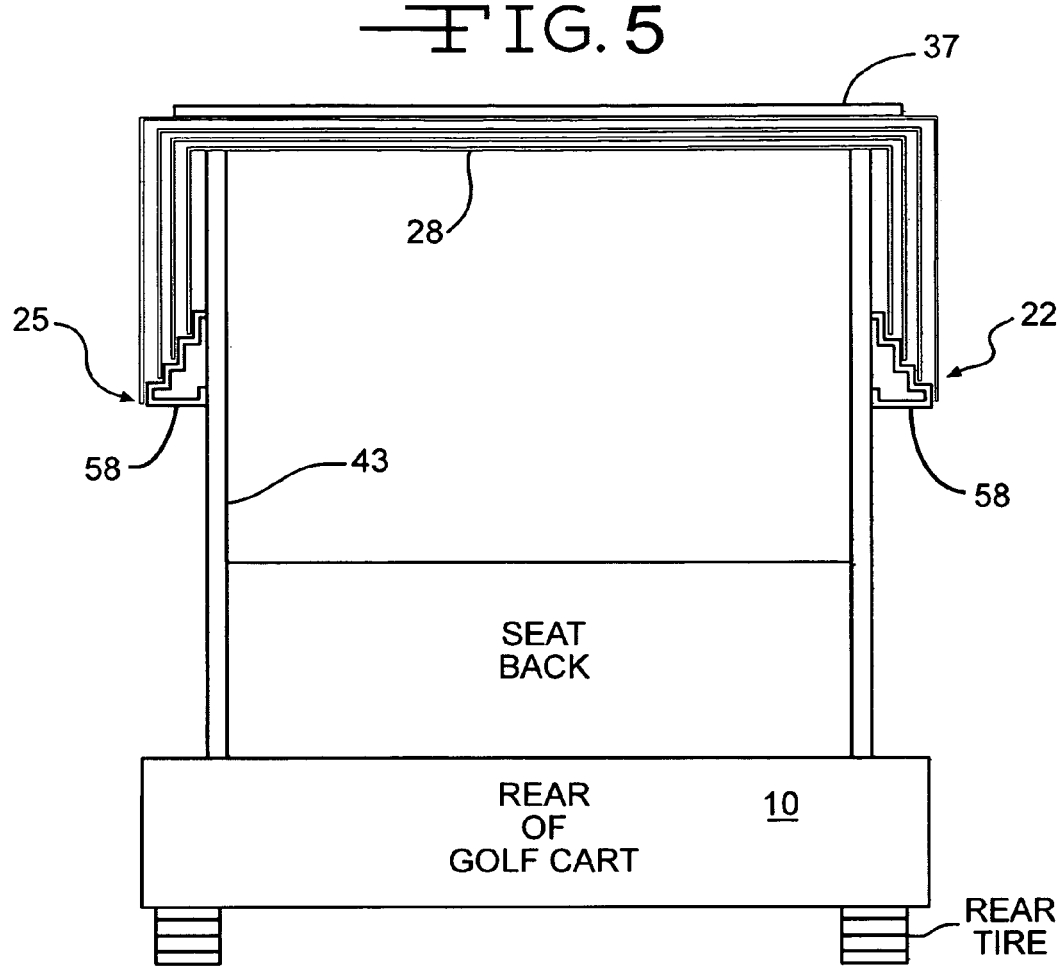
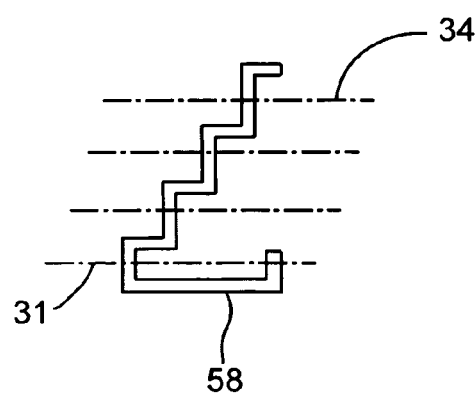
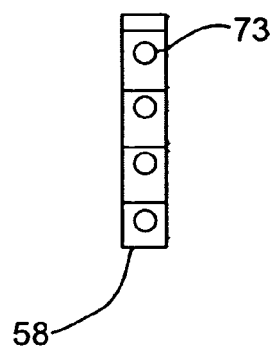

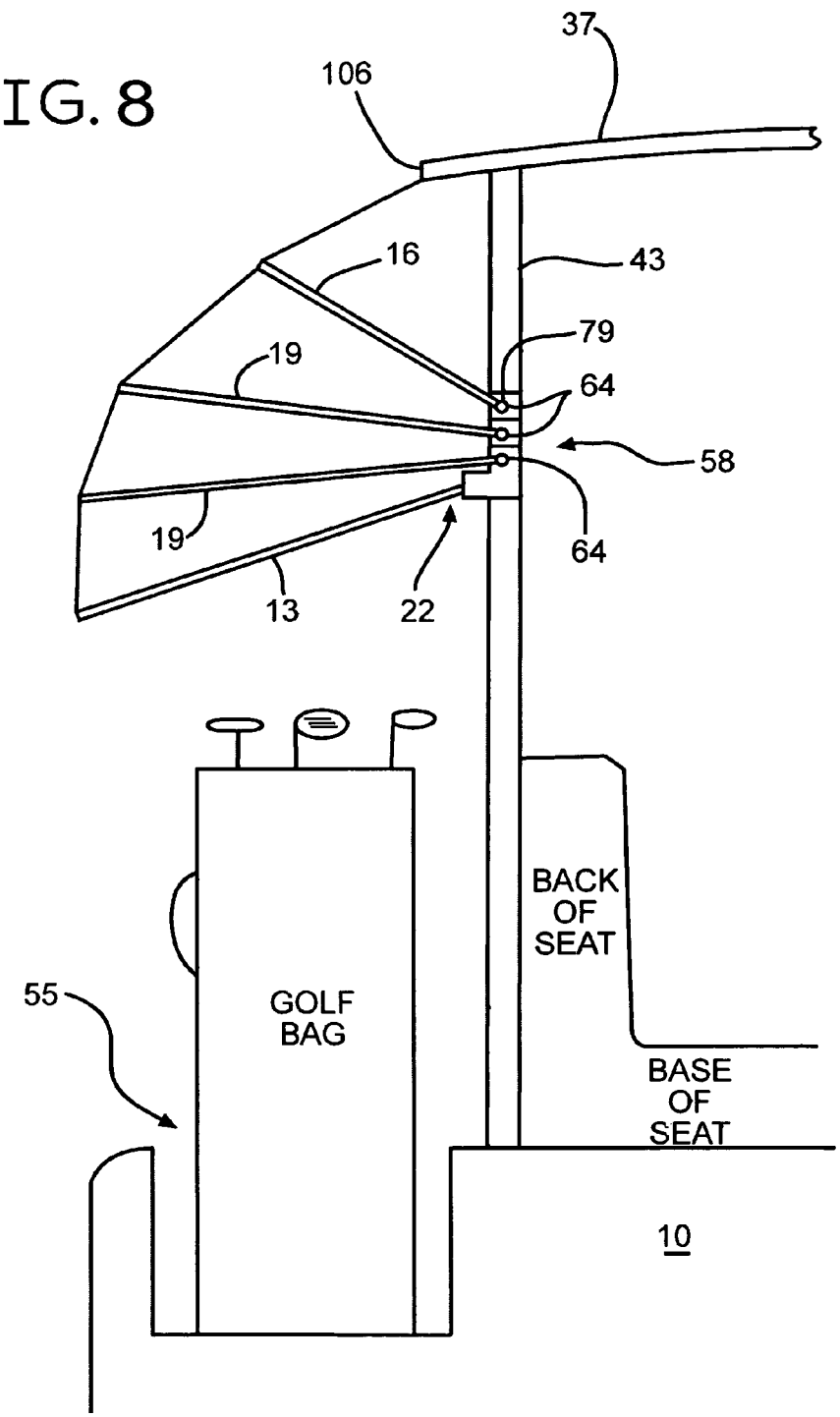

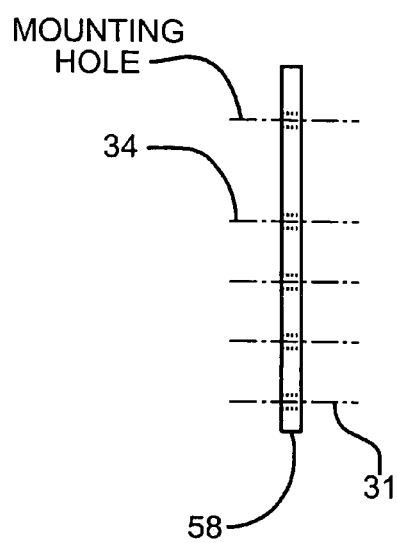
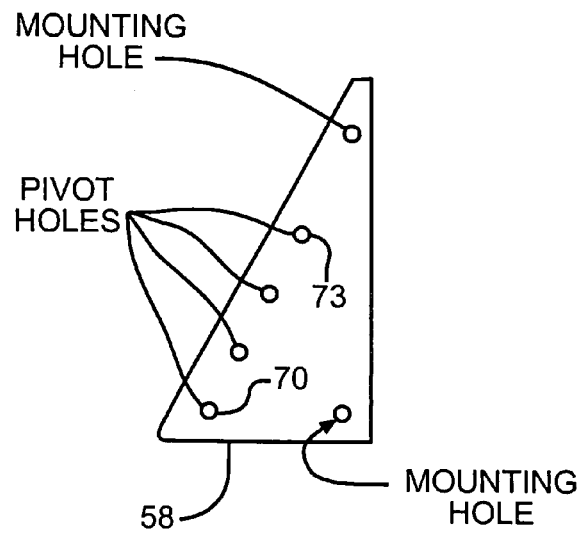
FIG. 16  FIG. 15
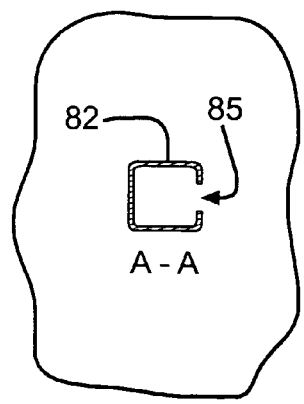
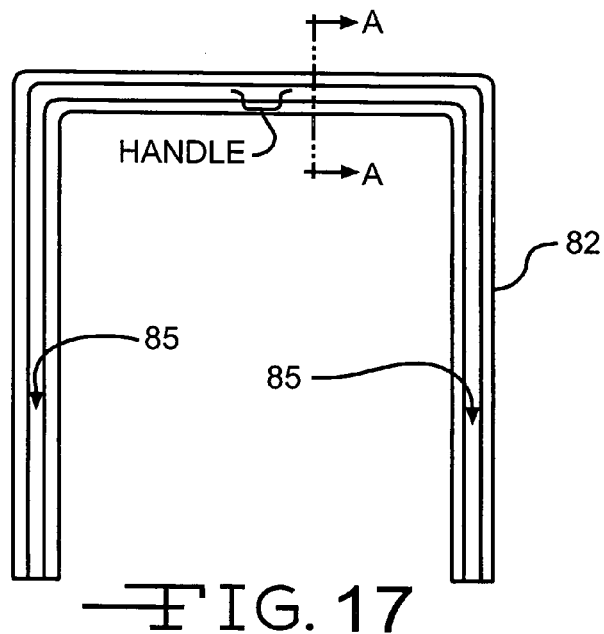
FIG. 19
FIG. 17
FIG. 18

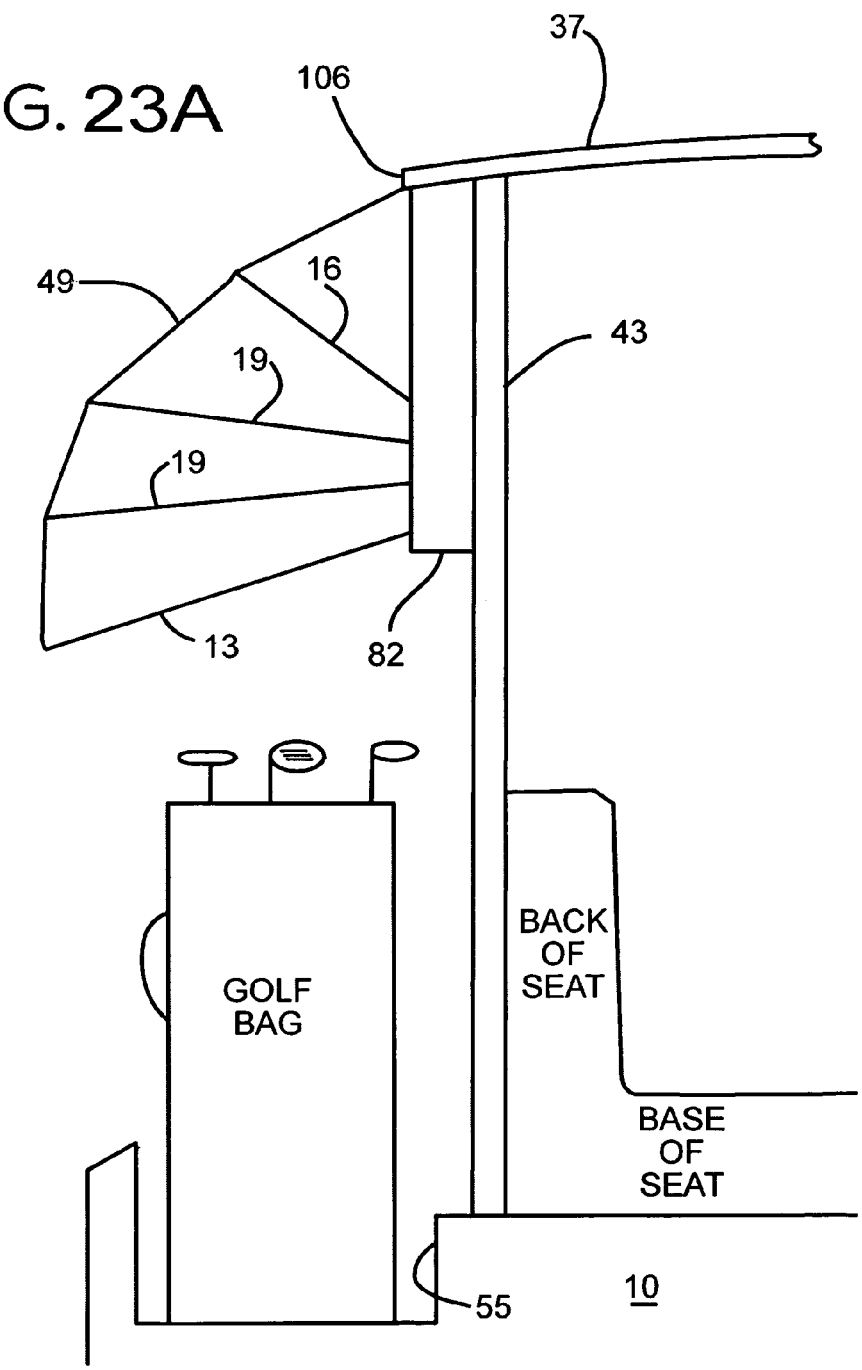

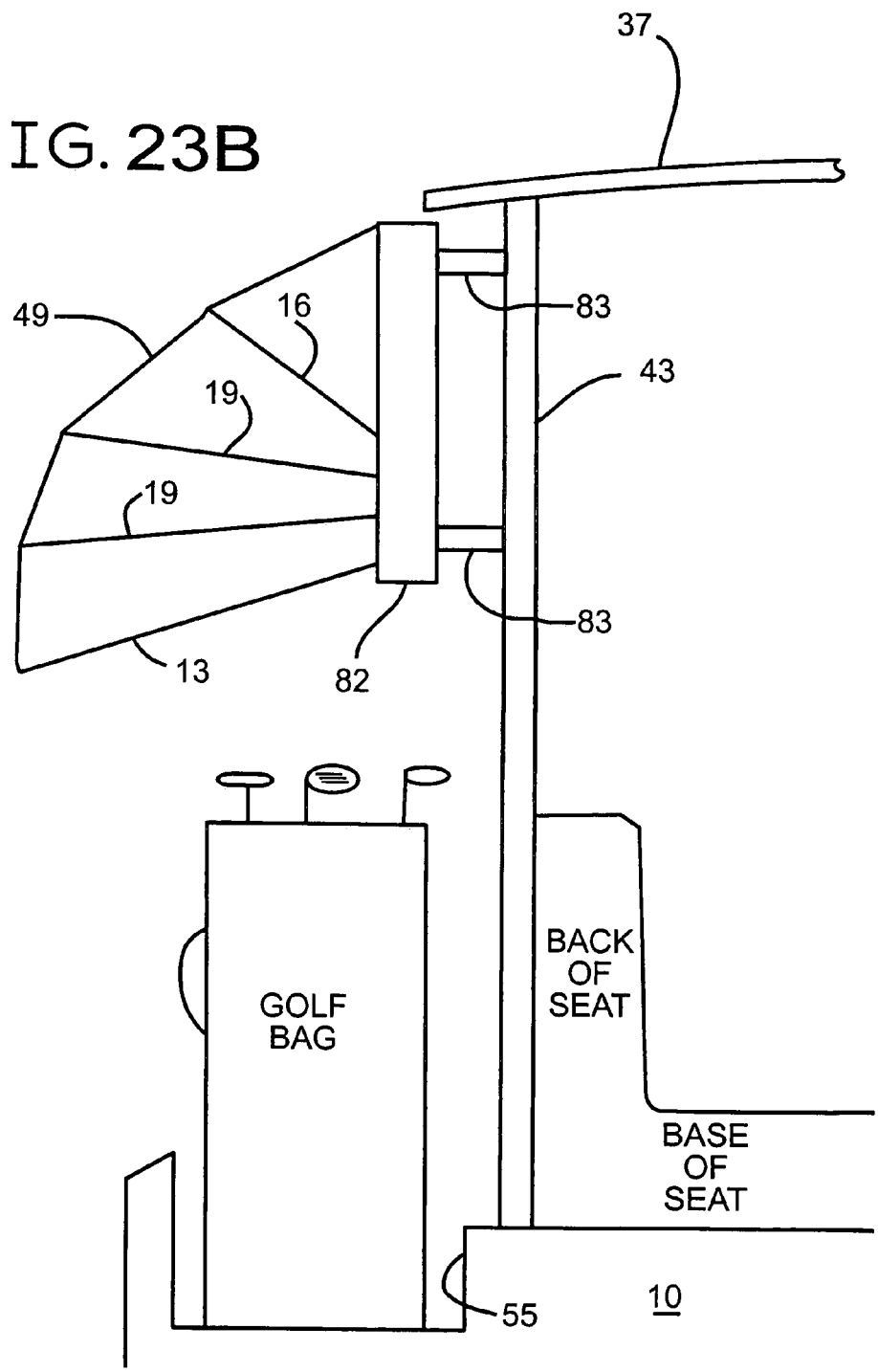

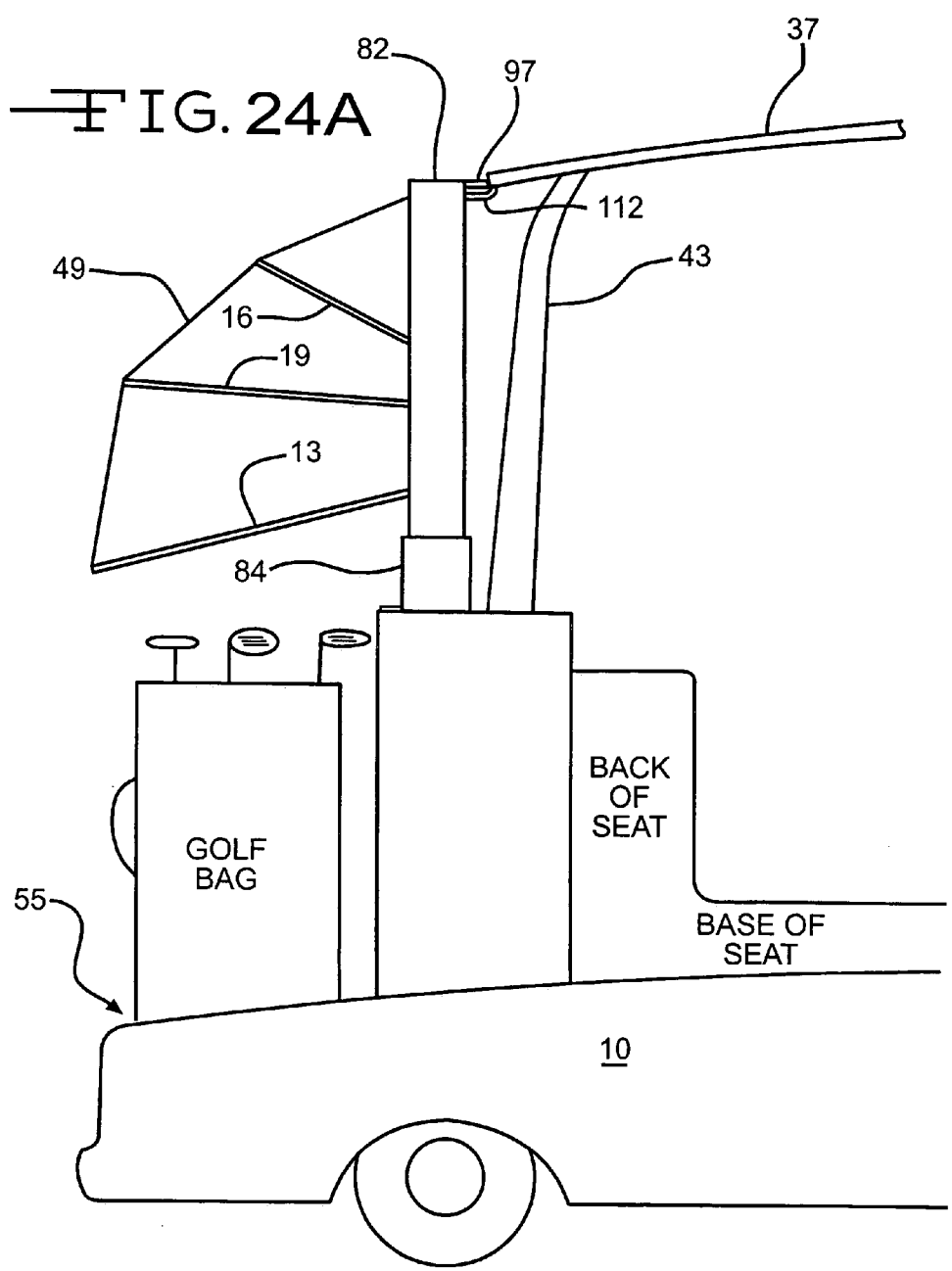

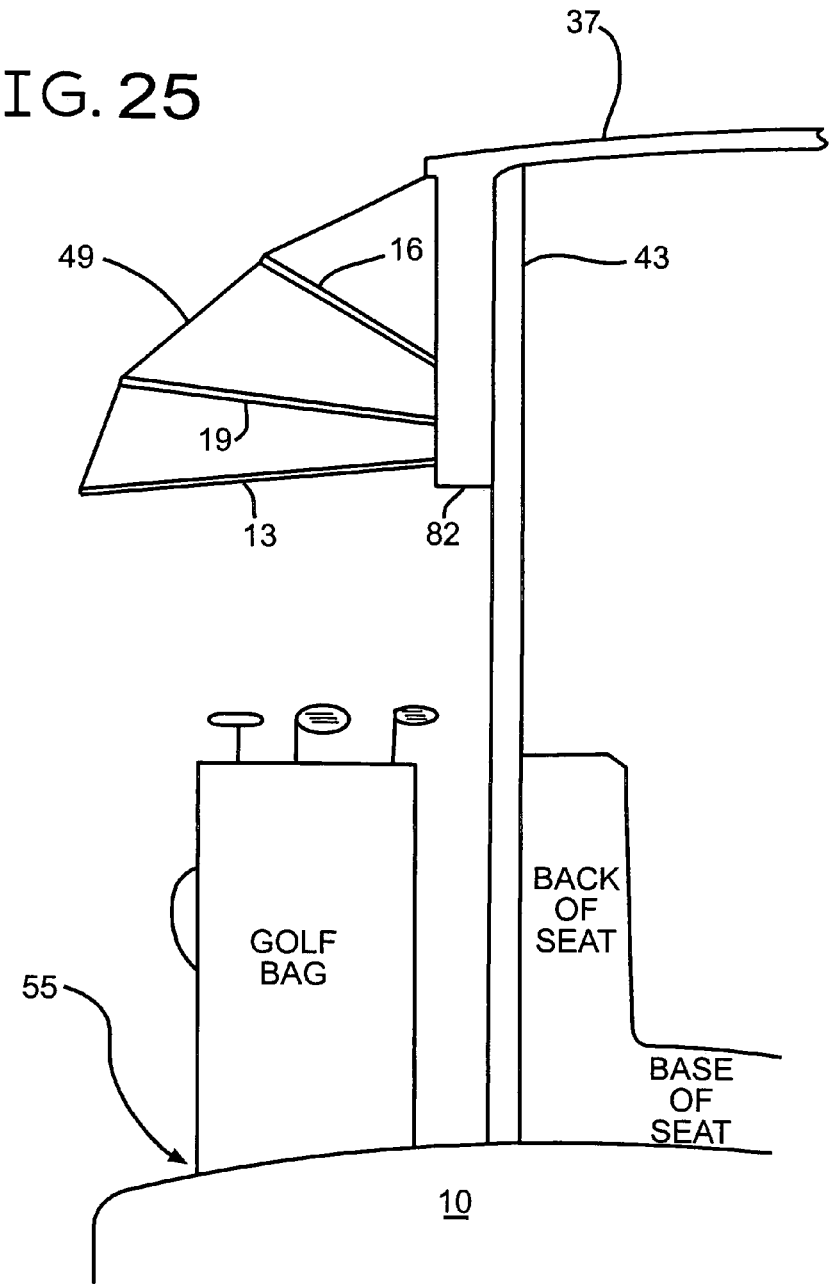

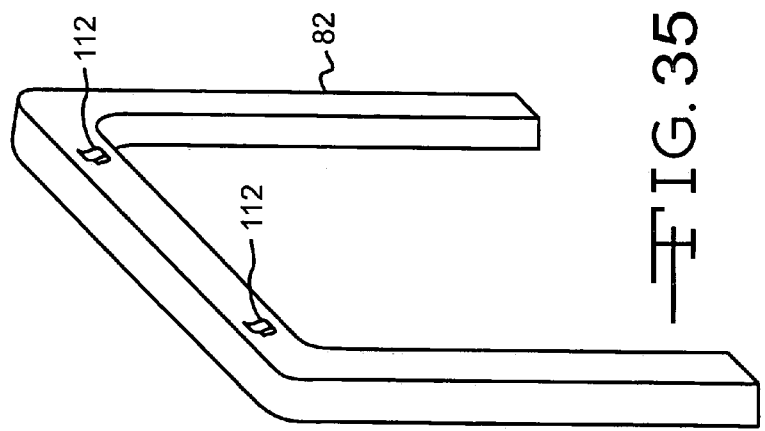
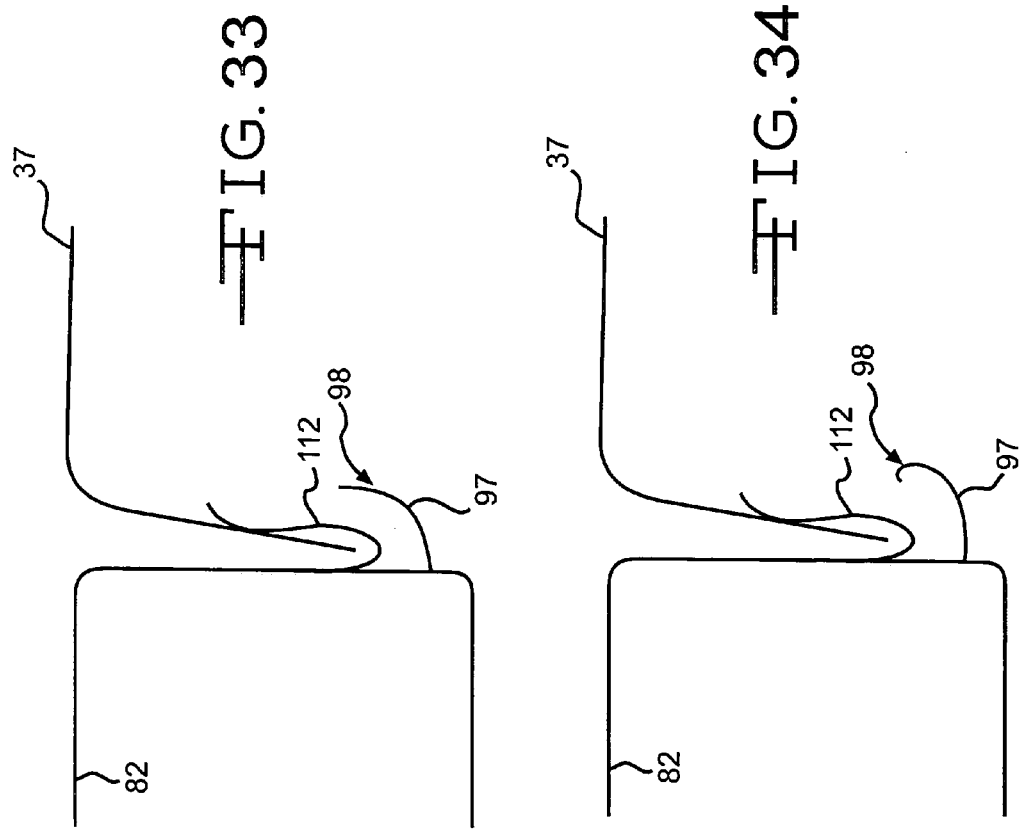

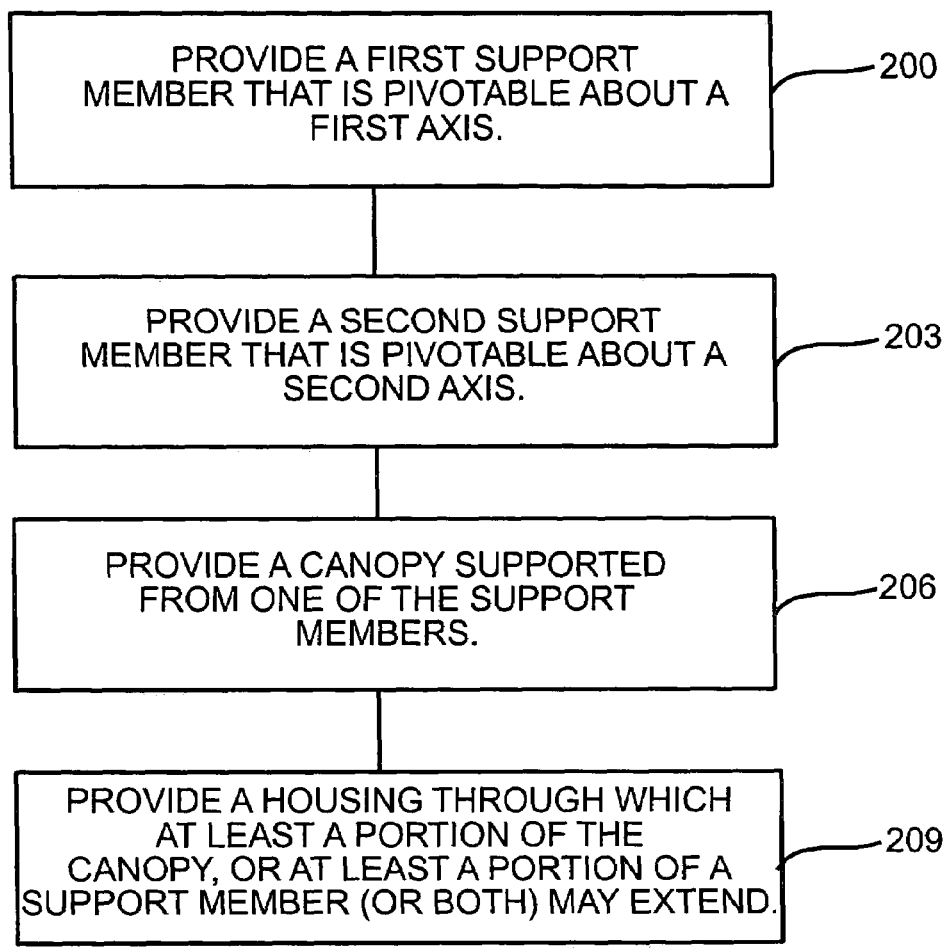

CART CANOPY SYSTEM

CROSS-REFERENCE TO RELATED APPLICATION

This application claims the benefit of priority to the following now abandoned U.S. provisional patent applications:
Ser. No. 60/542,726, filed on Feb. 6, 2004,
Ser. No. 60/542,727, filed on Feb. 6, 2004,
Ser. No. 60/557,925, filed on Mar. 31, 2004, and
Ser. No. 60/582,576, filed on Jun. 23, 2004.

FIELD OF THE INVENTION

The present invention relates to canopies for vehicles, such as golf carts.

BACKGROUND OF THE INVENTION

Some vehicles, such as golf carts, have a storage area located behind the driver's seat where equipment, such as golf clubs, may be kept. A protective canopy may be attached to the cart to shield the storage area and its contents from rain and sun. An example of such a device is shown in U.S. Pat. No. 4,830,037. In the prior art there are retractable awnings having a plurality of U-shaped rib members and a fabric cover. The U-shaped rib members have ends terminating at a common pivot point. Such a design places high forces on the pin used to provide the common pivot point, and results in frictional forces between the rib members, which make the awning difficult to deploy and store and may reduce the useful life of the awning. There is therefore a need for awning systems which reduce the forces placed on pivot pins and for awning systems which reduce or eliminate the frictional forces between rib members.

The prior art also includes designs in which each successively adjacent rib member is dimensioned slightly less than its preceding rib member to allow nesting of all the rib members in a common plane when the awning is in its retracted position. In order to allow for nesting and also provide proper coverage for the storage compartment of the cart, the prior art also discloses a transition plate extending between the cart roof and one of the rib members. Although there are advantages to an awning in which the rib members may nest with each other, the transition plate increases the cost associated with providing the awning, requires relatively precise positioning of the awning with respect to the cart roof, and complicates the design. Consequently, there is a need for nestable awning systems which do not require a transition plate.

The prior art also discloses gathering flaps, which are used to wrap around the rib members in order to hold the rib members in the nested position. Such flaps are unsightly, particularly when the awning is deployed and the flap is not in use. Even when the flap is in use, the flap does little to minimize the aesthetic degradation resulting from having an unused awning attached to the cart. Further, such flaps are difficult to use since the user must hold the rib members in the nested position with one hand and secure the flap with the other hand while leaning over the storage compartment of the cart. Placing the user in such a position may also present a safety issue, particularly when the surface the user is standing on is wet or consists of material which may shift, such as loose gravel. Therefore, there is a need for awning systems that do not require a flap to hold the awning in the undeployed position.

SUMMARY OF THE INVENTION

The present invention includes a canopy system, which may be used to shield a storage area. The invention may be embodied as a canopy system for a vehicle in which there is (a) a first support member having a first end, a second end, and a middle portion, the first end being pivotally supported from the cart and being pivotable about a first axis, (b) a second support member having a first end, a second end, and a middle portion, the first end being pivotally supported from the cart and being pivotable about a second axis, the second axis being different from the first axis, and (c) a canopy supported from at least one of the support members. For example, the canopy may be supported from one of the middle portions. The canopy system may be designed so that when the canopy is not in a deployed position, the first support member and the second support member are in a nesting relationship.

The invention may also be embodied as a canopy system for a vehicle in which there is (a) a support member, (b) a canopy supported by the support member, and (c) a housing having an opening. The opening may be designed so that at least a portion of the support member travels through the opening when the canopy is moved from a deployed position to a stored position. Alternatively, or in addition, the opening may be designed so that the canopy extends through the opening.

A method according to the invention may include (a) providing a first support member which is pivotable about a first axis, (b) providing a second support member which is pivotable about a second axis, the first axis being different from the second axis, (c) providing a canopy supported from the first support member, and (d) moving the first support member so as to pivot the first support member about the first axis from a first position in which the support members are in a nesting relationship with each other, to a deployed position in which the canopy is extended over a portion of the vehicle.

For a fuller understanding of the nature and objects of the invention, reference should be made to the following detailed description taken in conjunction with the accompanying drawings, in which:

FIG. 1A is a side view partially showing a golf cart, and showing a canopy system according to the invention;

FIG. 2 is a rear view of a golf cart and a canopy system according to the invention, wherein the canopy is not deployed and the support members are nested;

FIG. 3 is a view of one of the brackets shown in FIG. 2;

FIG. 4 is a side view of the bracket shown in FIG. 3;

FIG. 5 is a rear view of a golf cart and a canopy system according to the invention;

FIG. 6 is a view of one of the brackets shown in FIG. 5;

FIG. 7 is a side view of the bracket shown in FIG. 6;

FIG. 8 is a side view partially showing a golf cart, and showing a canopy system according to the invention;

FIG. 15 is a view of one of the brackets shown in FIG. 14;

FIG. 16 is a side view of the bracket shown in FIG. 15;

FIG. 17 shows a housing according to the invention;

FIG. 18 is a bottom view of the housing shown in FIG. 17;

FIG. 19 shows a cross-sectional view A—A corresponding to FIG. 17;

FIG. 23A is a side view partially showing a golf cart, and showing a canopy system having a housing according to the invention;

FIG. 23B is a side view similar to FIG. 23A, except that the housing is held by brackets and distanced from the cart roof supports;

FIG. 24A is a side view partially showing a golf cart, and showing a canopy system having a housing according to the invention;

FIG. 25 is a side view partially showing a golf cart, and showing a canopy system having a housing according to the invention;

FIG. 33 shows a housing, which has an extension, according to the invention;

FIG. 34 shows a housing, which has an extension, according to the invention;

FIG. 35 is a perspective view of a housing having hooks according to the invention; and FIG. 36 is a flow chart depicting a method according to the invention.

DETAILED DESCRIPTION OF THE INVENTION

Figure 14:
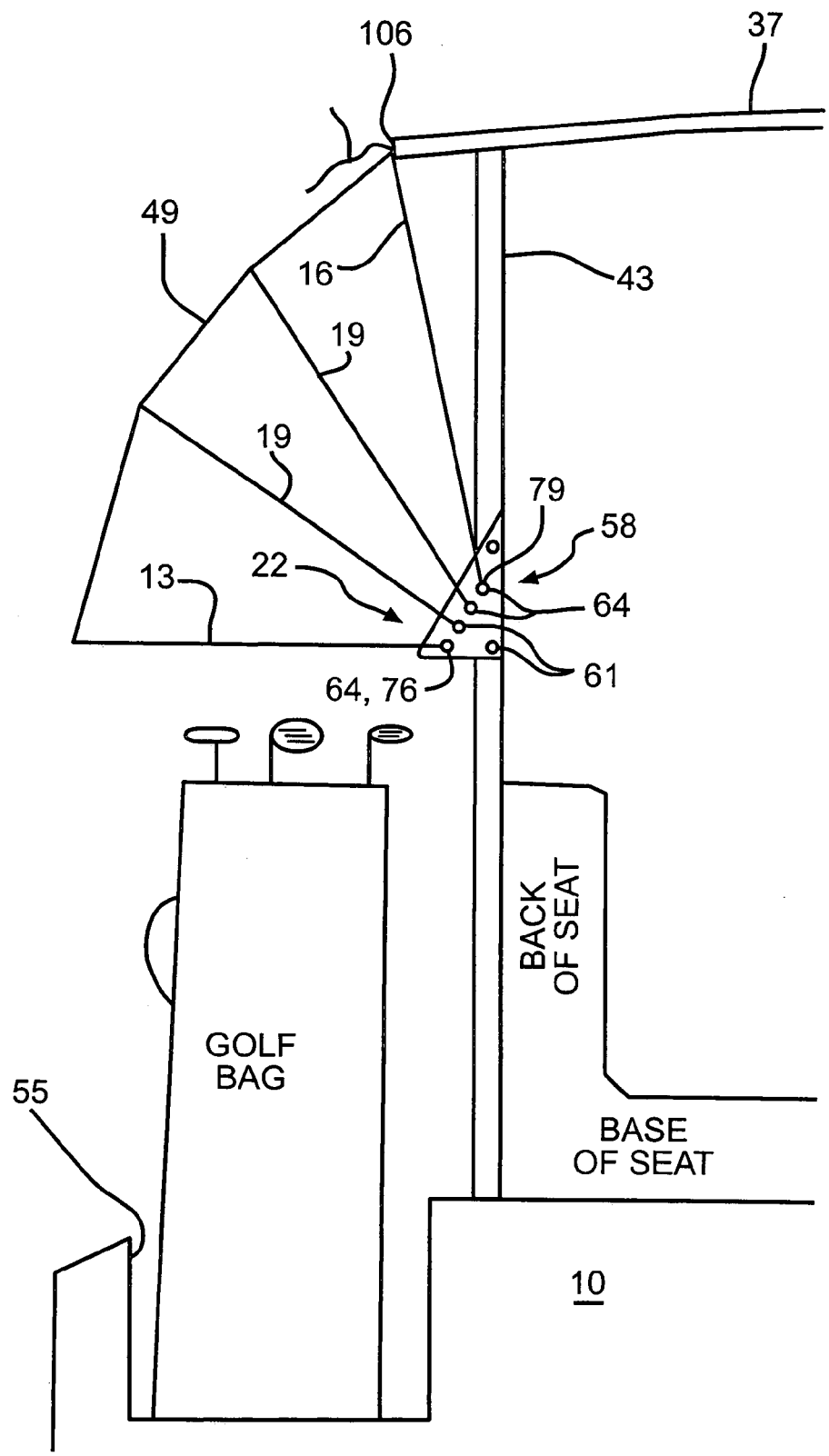
FIG. 14 is a side view partially showing a golf cart, and showing a canopy system according to the invention.

The invention may be embodied as a canopy system for a vehicle 10, such as a golf cart. In that embodiment, there may be a first support member 13 and a second support 16 member. FIGS. 1A, 8 and 14 are examples of such a canopy system. Additional support members 19 may also be included. For example, FIGS. 2 and 5 each show four support members 13, 16, 19. Each of the support members 13, 16, 19 may have a first end 22 and a second end 25. A middle portion 28 may also be provided to extend between the first end 22 and the second end 25. Each of the first ends 22 may be pivotally supported from the cart 10. One or more of the support members 13, 16, 19 may have a substantially U-shape.

Figure 1B:
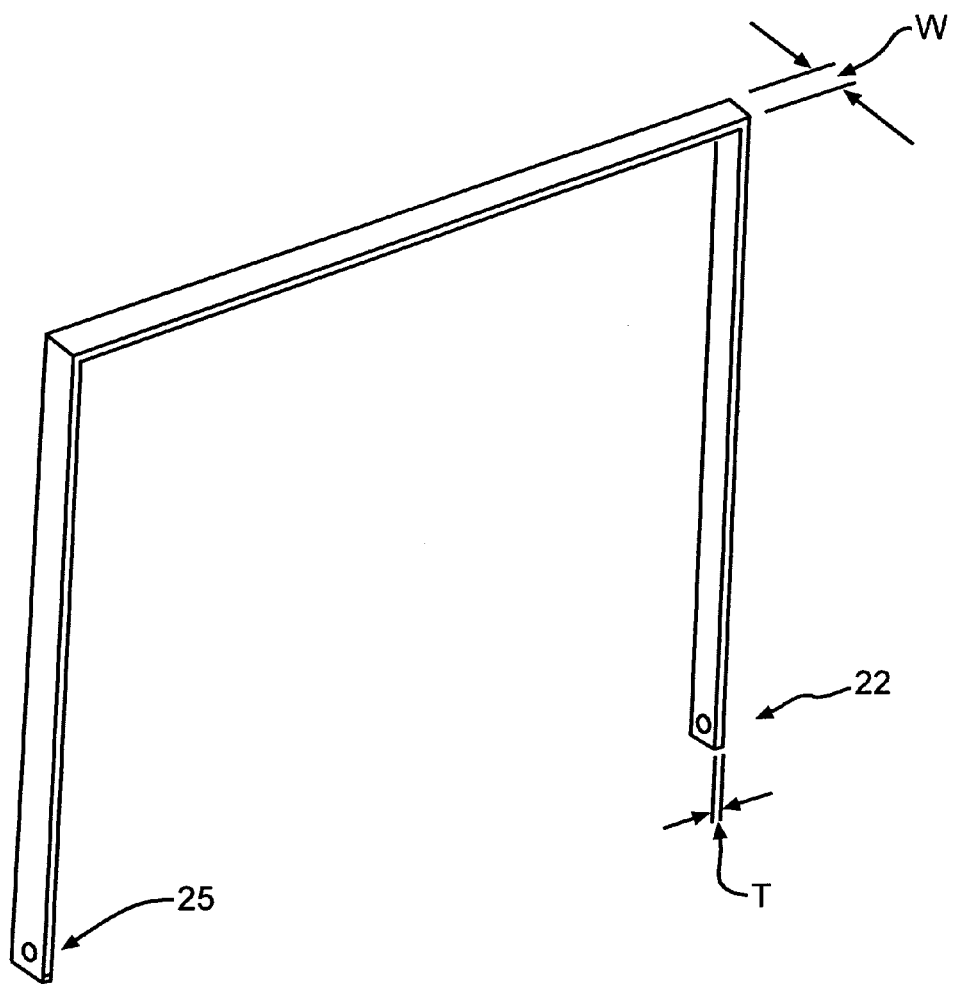
FIG. 1B is a perspective view of one of the support members.
Figure 10:
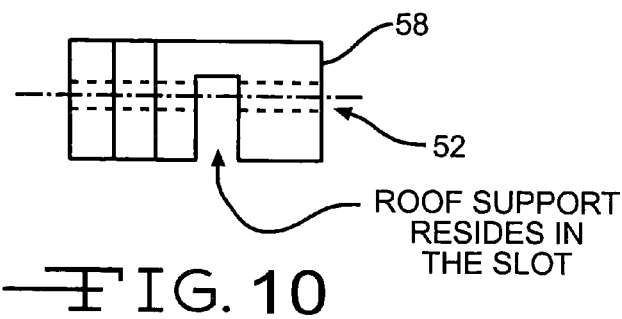
FIG. 10 is a top view of the bracket shown in FIG. 9.
Figure 9:
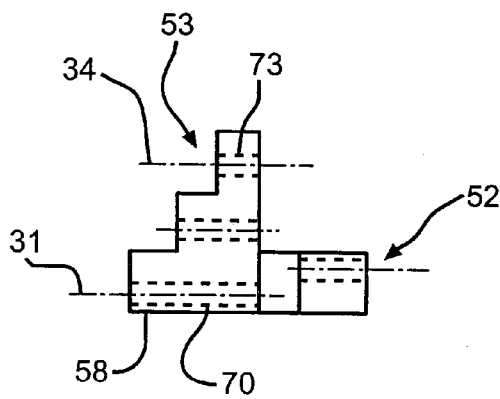
FIG. 9 is a view of one of the brackets shown in FIG. 8.
Figure 12:
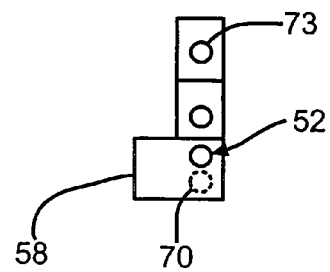
FIG. 12 is a side view of the bracket shown in FIG. 9.
Figure 11:
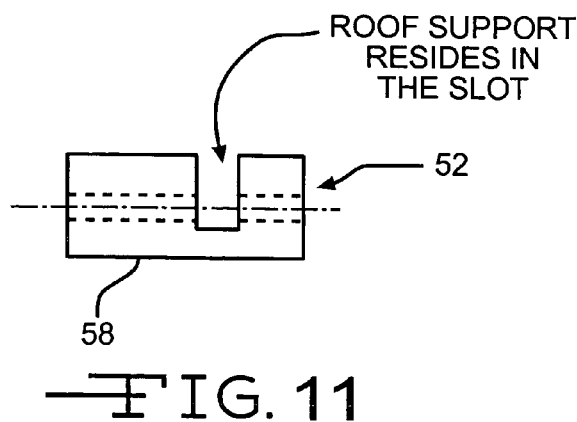
FIG. 11 is a bottom view of the bracket shown in FIG. 9.

An example of a support member 13, 16, 19 is shown in FIG. 1B. In an embodiment of the invention, the support member 13, 16, 19 has a width W that is between 3 and 6 inches. It has been found that gathering of the canopy 49 is made easier when the width W is in this range. The thickness T may be made less than the width W.

The first end 22 of the first support member 13 may be pivotable about a first axis 31. The first end 22 of the second support member 16 may be pivotable about a second axis 34. FIGS. 3, 6, 9 and 16 show how the axes might be configured. The second axis 34 may be different from the first axis 31. In this manner, the first support member 13 may pivot about an axis which is different from the axis about which the second support member 16 may pivot. FIGS. 1A, 5, 8 and 14 show embodiments of the invention in which the first axis 31 is further from a roof 37 of the cart 10 than the second axis 34.

Figure 13:
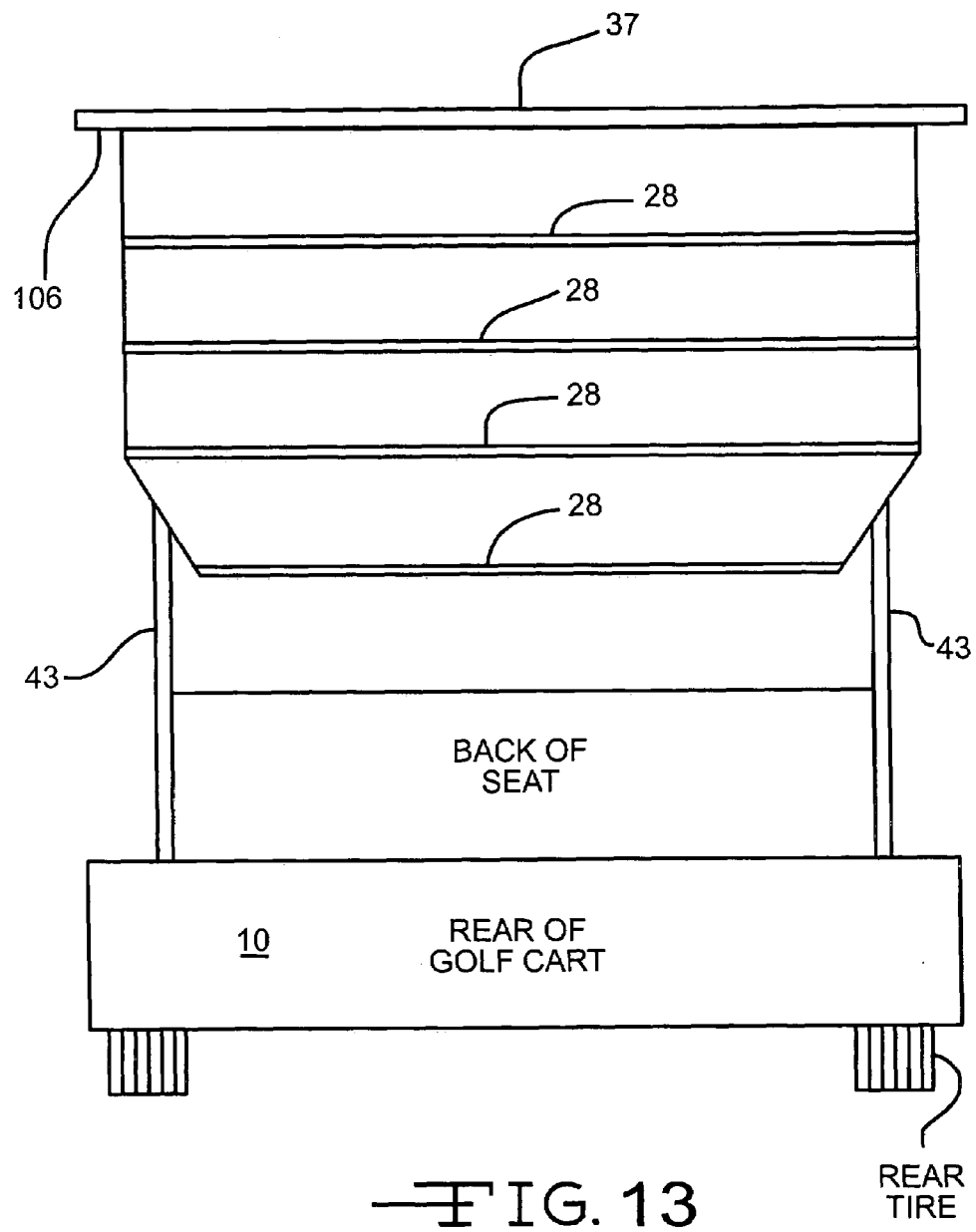
FIG. 13 is a rear view of the cart and canopy system shown in FIG. 8 with the canopy in the deployed position.

FIG. 8 shows an embodiment in which not all of the support members 13, 16, 19 are on the same side of the roof support 43. Such an embodiment of the invention may have the first end 22 of the first support member 13 at a first location 52 that appears to be between roof supports 43 of the vehicle 10 when a person views the rear of the vehicle 10. The first location 52 need not actually be between the roof supports 43, but in this embodiment would appear to be between roof supports 43. The first end 22 of another of the support members 16, 19 may reside at a second location 53 that appears not to be between the roof supports 43 when a viewer is looking at the rear of the vehicle 10. FIGS. 9–12 show a bracket 58 which may be used to accomplish this embodiment of the invention. FIG. 13 shows such an embodiment of the invention with the canopy in the deployed position. Notice a lower portion of the canopy 49 angles toward the center of the cart 10 as a result of the first support member 13.

The canopy system may include a canopy 49 supported from at least one of the support members 13, 16, 19. The canopy may be supported from the middle portion 28. The canopy 49 may be selectively moved between a deployed position and an undeployed position. When the canopy 49 is in the deployed position, the canopy 49 may provide cover for the storage area 55 of the cart 10. When the canopy 49 is not in a deployed position, the first support member 13 and the second support member 16 may be in a nesting relationship. FIGS. 2 and 5 show the support members 13, 16, 19 in such a nesting relationship.

The canopy system may have a bracket 58. FIGS. 1A, 2, 3 and 4 show one such bracket 58. FIGS. 5–7 show another such bracket 58. FIGS. 8–12 show yet another bracket 58. FIGS. 14–16 show yet another bracket 58. Although FIGS. 1A, 2, 5 and 14 show the brackets 58 mounted on the outside portions of the roof supports 43, it should be noted that the brackets 58 may be mounted on the inside portions of the roof supports 43. The bracket 58 may be supported from the cart 10, for example, the bracket 58 may be attached to a roof support 43 of the cart 10. The bracket 58 may be attached to the cart 10 via a threaded fastening system, such as a nut-and-bolt combination 61, or via an unthreaded fastener system, such as a rivet 64 or via adhesive. In addition, the bracket 58 may be an integral part of the roof support 43, for example by molding the bracket 58 as part of the roof support 43.

The bracket 58 may provide a location used to pivotally attach at least one of the support members 13, 16, 19. In one embodiment of the bracket 58, the bracket provides a different location for each support member 13, 16, 19 to be pivotally attached.

In an embodiment of the bracket 58, the bracket 58 has a first hole 70 and a second hole 73. A first pivot pin 76 may extend through the first hole 70, and extend through the first end 22 of the first support member 13. In this manner, the first member 13 may be pivoted about the first pivot pin 76. A second pivot pin 79 may extend through the second hole 73, and extend through the first end 22 of the second support member 25. In this manner, the second member 25 may be pivoted about the second pivot pin 79. One such bracket is shown in FIGS. 3 and 4. Another such bracket 58 is shown in FIGS. 6 and 7. Yet another bracket 58 is shown in FIGS. 9–12. In FIGS. 3 and 6 the bracket is stepped. In this embodiment, the support members 13, 16, 19 may have different dimensions so that when the canopy 49 is not deployed, the support members 13, 16, 19 nest with each other.

Another bracket is shown in FIGS. 14–16. Such a bracket 58 may be structured so that the first axis 31 and the second axis 34 are located to allow for a nesting relationship in which the middle portions 28 of the support members 13, 16, 19 nest with each other when the canopy 49 is not deployed.

Figure 20:
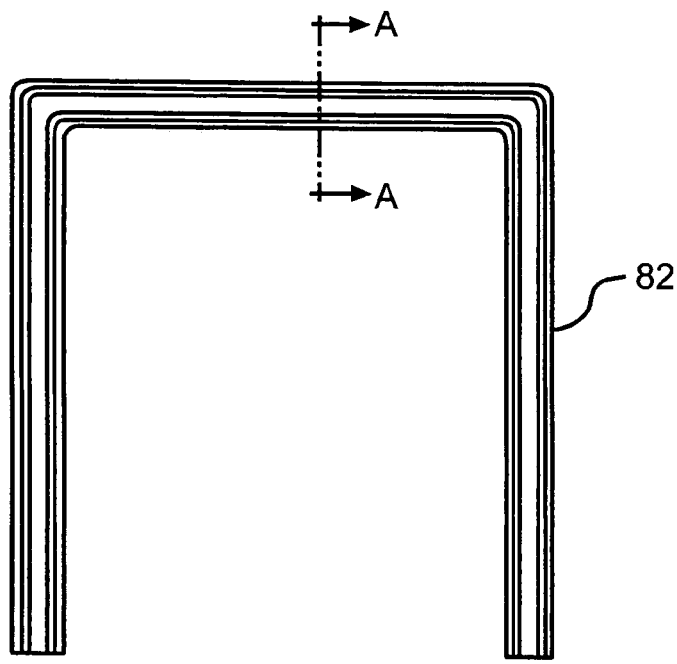
FIG. 20 shows a view of another housing according to the invention.
Figure 21:
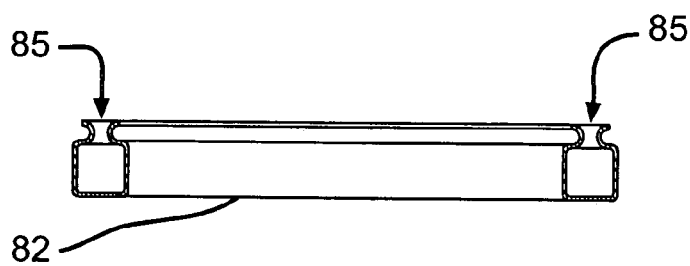
FIG. 21 shows a bottom view of the housing shown in FIG. 20.
Figure 22:
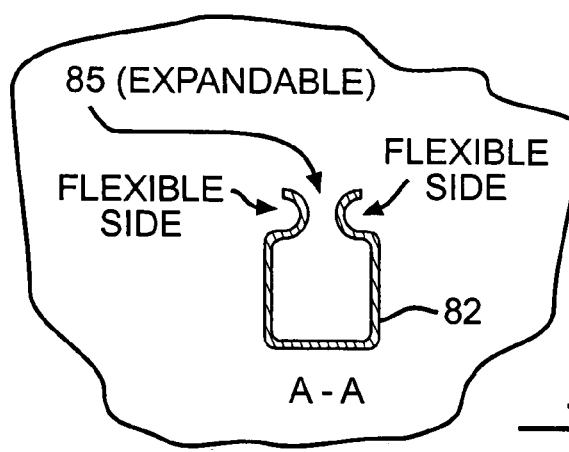
FIG. 22 shows a cross-sectional view A—A corresponding to FIG. 20.

The invention may include a housing 82. FIGS. 17–19 show a housing 82 according to the invention. FIGS. 20–22 show another housing 82. The housing 82 may be made from a semi-rigid material, such as plastic. The housing 82 may be used to enclose all or part of a canopy 49, support members 13, 16, 19, or both when the canopy 49 is not deployed. The housing 82 may have a shape that is similar to that of a support member 13, 16, 19. For example, the housing 82 may have a substantially U-shape.

The housing 82 may be supported from the cart 10, or may be an integral part of the cart 10. FIG. 23A shows a housing 82 which is supported from the roof supports 43 and/or roof 37 of the cart 10. FIG. 231B snows a housing 82 which is supported from the roof supports 43 via housing brackets 83.

Figure 24B:
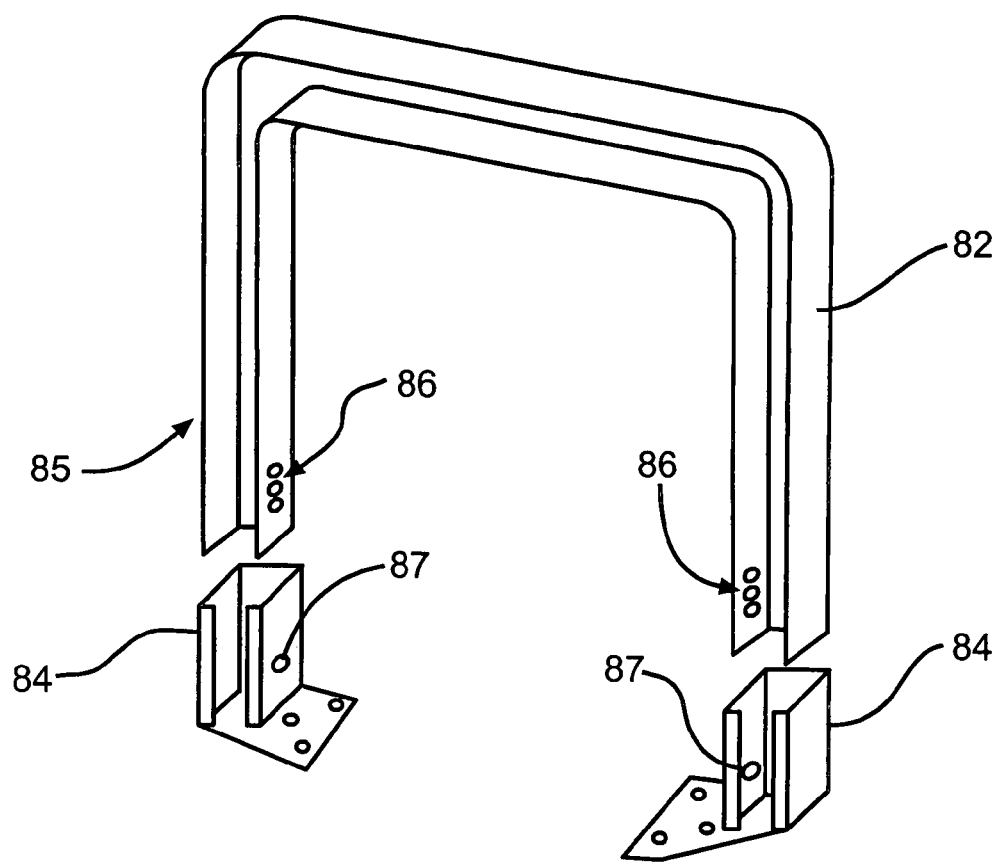
FIG. 24B is a perspective view showing the support base from FIG. 24A in more detail.
Figure 24C:
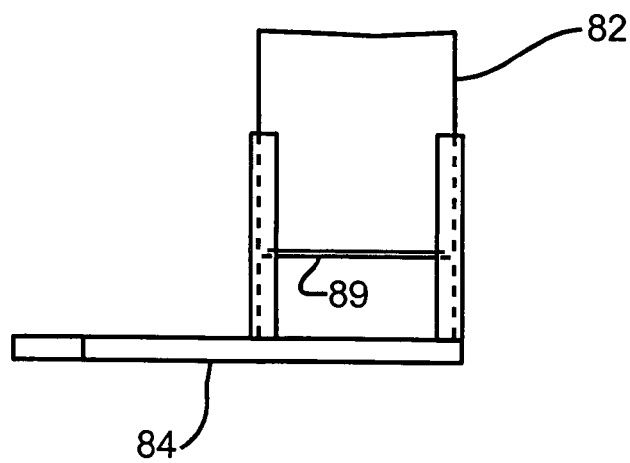
FIG. 24C is a front view of the support base from FIGS. 24A and 25B showing use of a support block.

FIG. 24A shows a housing 82 that is supported from a support base 84 that may extend from the storage area of the cart 10, or from structures used to hold golf bags. FIG. 24B shows one such support base 84 in more detail. The housing 82 may be provided with holes 86 that may be used along with a hole 87 in the support base 84 to receive a screw or set pin, for purposes of adjusting the height of the housing 82. FIG. 24C shows a different manner of adjusting the height of the housing 82. A support block 89 may be placed in the support base 84, and the housing 82 may be supported from the support base 84. An adhesive, screws or set pins may be used to secure the housing 82, the support block 89, or both to the support base 84.

FIG. 25 shows a housing 82 which is an integral part of the cart roof 37. In this embodiment, the housing 82 may be molded with the cart roof 37, or attached to the cart roof 37 so that the housing 82 appears to be an integral part of the cart roof 37.

Figure 26:
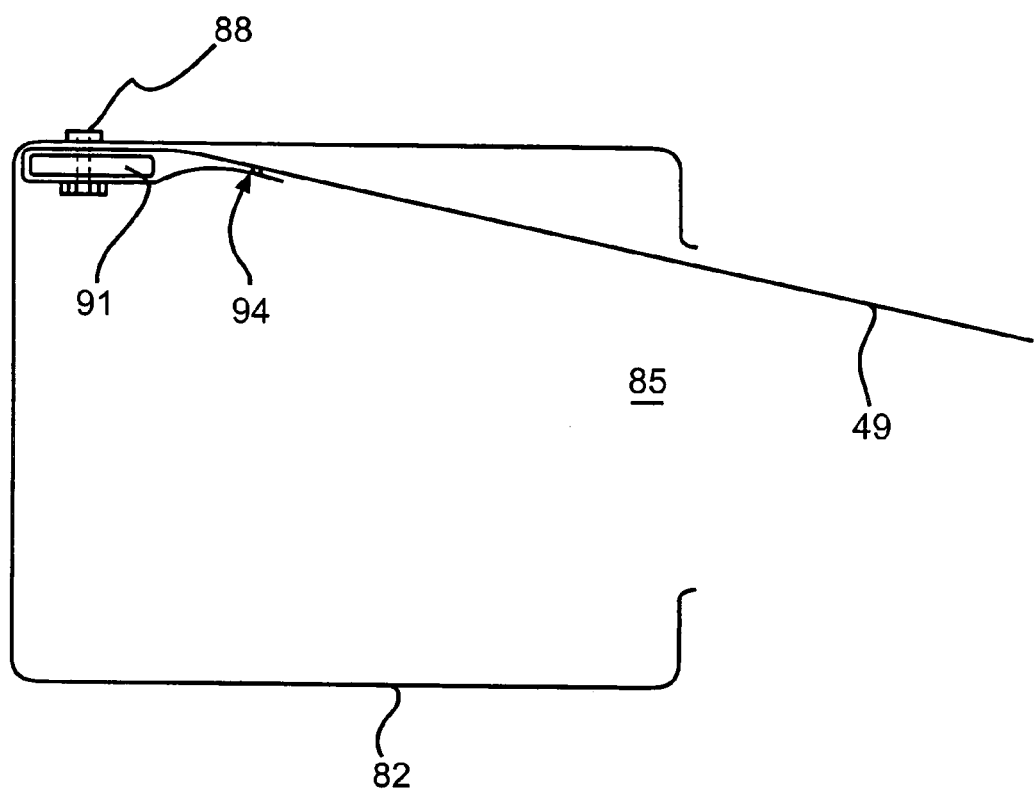
FIG. 26 is a cut-away side view showing how a canopy might be attached to a housing according to the invention.

In an embodiment of a canopy system according to the invention, the housing 82 may have an opening 85 through which the canopy 49 may extend when the canopy 49 is deployed. FIG. 26 shows how the canopy might extend through the opening 85 when the canopy 49 is in the deployed position. A fastener 88 may be used to attach the canopy 49 to the housing 82. A bar 91 may be provided to distribute forces applied to the canopy 49. The canopy 49 may encircle the bar 91 and may be stitched to itself with stitching 94. In such an embodiment, the fastener 88 may extend through the bar 91.

A housing 82 according to the invention may have an opening 85 through which at least part of at least one of the support members 13, 16, 19 may travel when the canopy 49 is moved from a deployed position to a position in which the canopy 49 is not deployed. In such a housing 82, the support members 13, 16, 19 may be partially or completely covered so as to protect the support members 13, 16, 19, or remove the support members 13, 16, 19 from view. The housing 82 may have an opening 85 that is similar to that of a support member 13, 16, 19. For example, the opening 85 may be substantially U-shaped.

Figure 27:
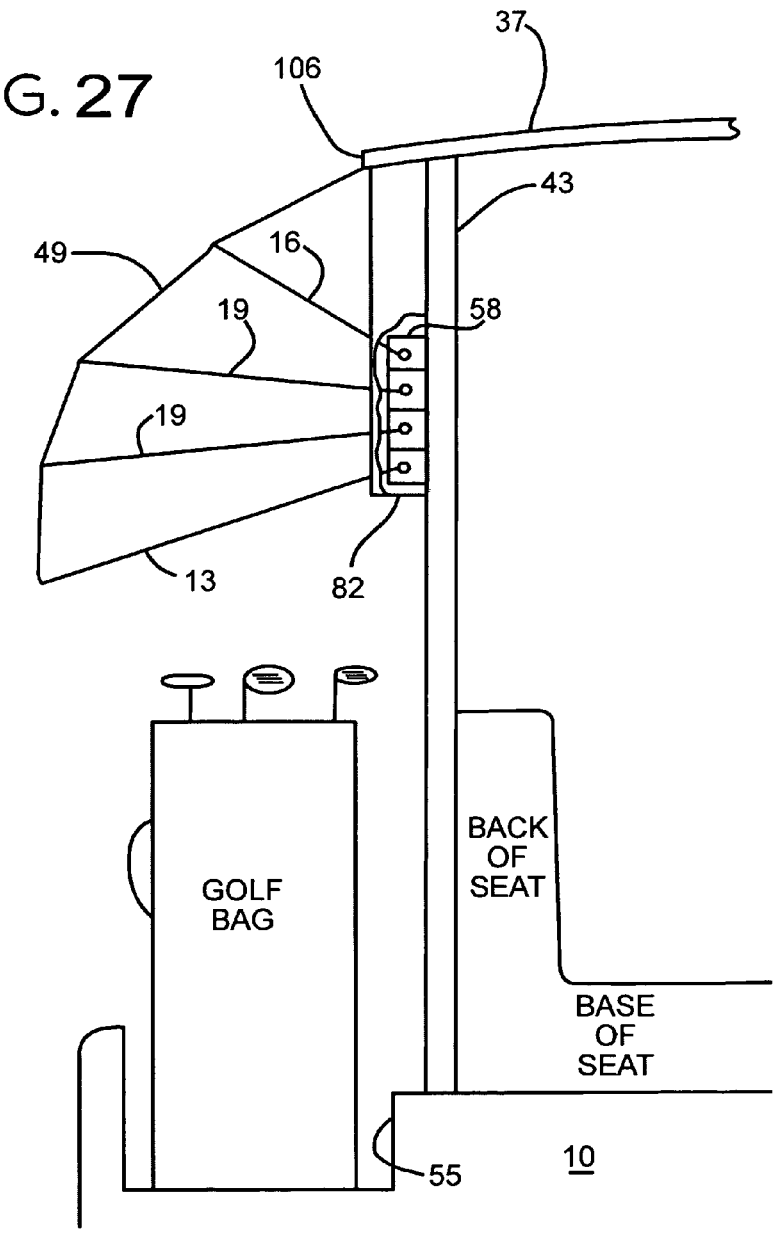
FIG. 27 is a side view partially showing a golf cart, and showing a canopy system having a housing, part of which has been cut away to show a bracket in the housing.
Figure 28:
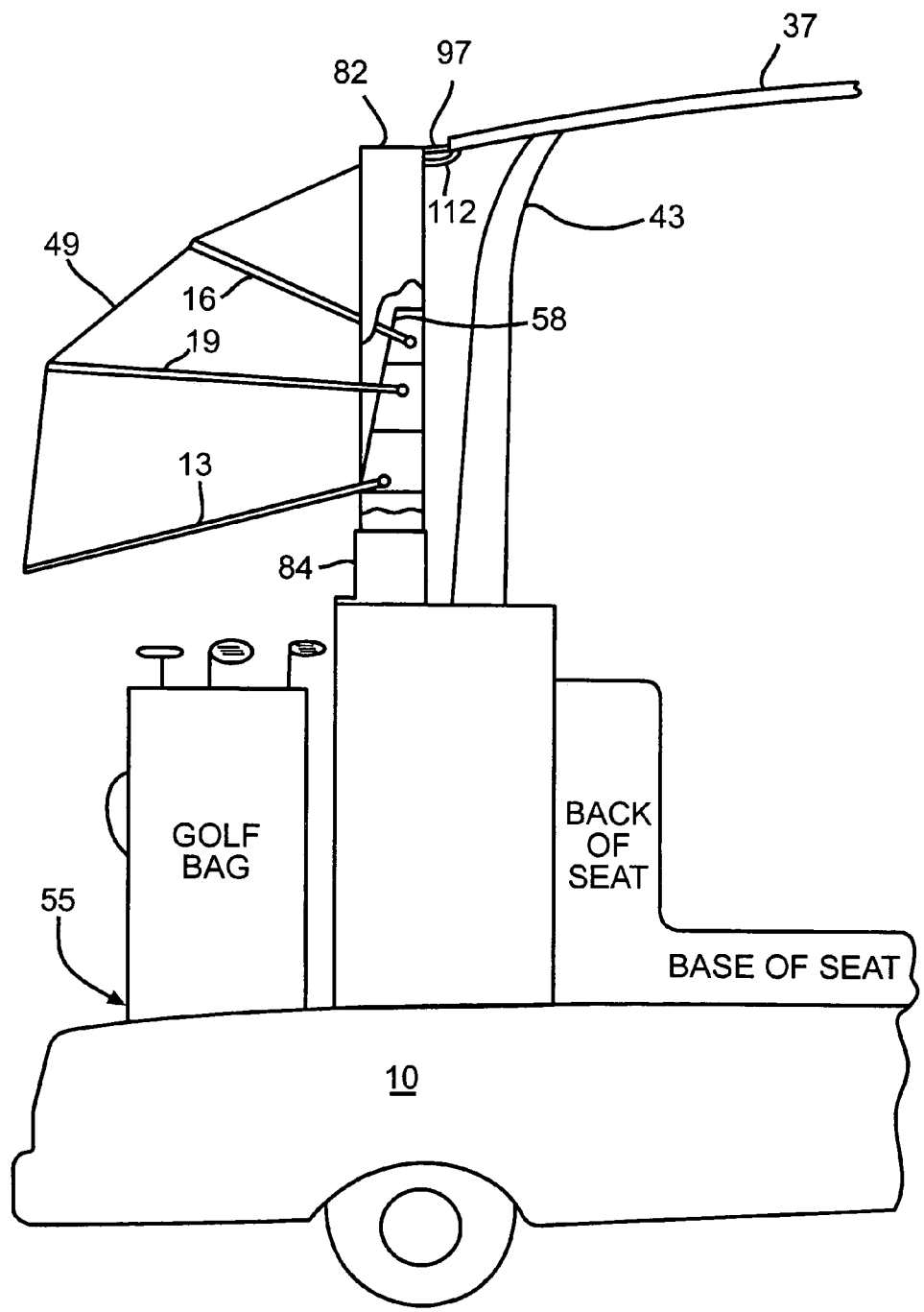
FIG. 28 is a side view partially showing a golf cart, and showing a canopy system having a housing, part of which has been cut away to show a bracket in the housing

FIG. 27 shows an embodiment of the invention in which a housing 82 is supported from the cart 10 and the bracket 58 is also supported from the cart 10. FIG. 28 shows an embodiment of the invention in which the housing 82 is supported from the cart 10 and the bracket is supported from the housing 82.

It should be understood that an embodiment of the invention in which there is a housing 82 may have merely one support member 13, a canopy 49 supported by the support member 13, and the housing 82 may have the opening 85. As described above, at least a portion of the support member 13 may travel through the opening 85 when the canopy 49 is moved from a deployed position to a stored position. FIGS. 17 and 20 show an embodiment of the invention in which the opening 85 in the housing is positioned so the canopy 49 may extend through the opening 85 when the canopy is deployed. The opening 85 may be substantially U-shaped. More than one support member 13, 16, 19 may be provided. The housing 82 may be made from a semi-rigid material, such as plastic or sheet metal. The housing 82 may be supported from the cart 10, for example, by using a threaded system or an unthreaded system. The housing 82 may also be an integral part of the cart, for example, the roof of the cart 10.

Figure 29:
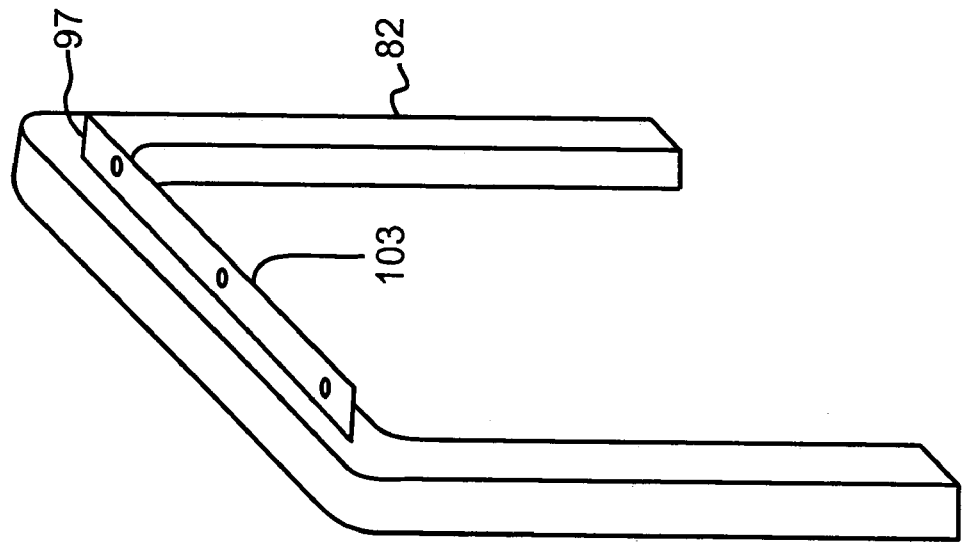
FIG. 29 is a perspective view of a housing according to the invention showing an extension.

FIGS. 24 and 29 show embodiments of the housing 82 having an extension 97. The extension 97 may be provided to prevent water from running off the roof 37 onto items or people being carried by the cart 10. The extension 97 may be attached to the housing 82, the roof 37, or may be wedged between the housing 82 and the roof 37. The extension may have an edge 103 which resides proximate to a roof 37 of the vehicle 10. FIG. 24A shows an example in which the edge 103 of the extension 97 may be provided proximate to, or in contact with, a rear edge 106 of the roof.

Figure 30:
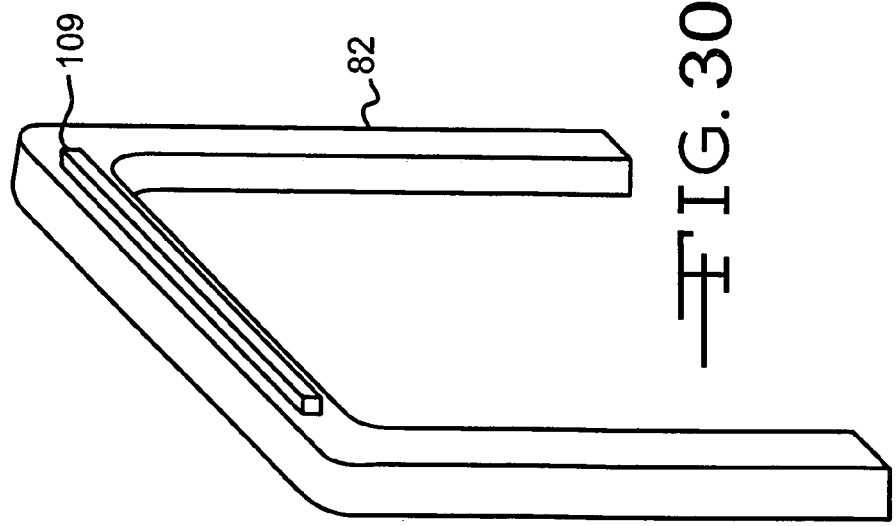
FIG. 30 is a perspective view of a housing according to the invention, and showing a compressible gasket mounted thereto.

The edge 103 may be in a sealing relationship with the roof 37, and the seal may be provided by a gasket residing between the roof and the extension. FIG. 30 shows a housing 82 having a gasket 109 attached directly to the housing 82. It should be noted that the gasket 109 may be attached to the extension 97, when the extension 97 is provided.

FIGS. 31 through 34 show embodiments in which the extension 97 extends under the roof 37. FIGS. 31 through 34 illustrate that the extension 97 need not contact the roof in order to prevent water from running off the roof 37 onto items or people being carried by the cart 10. Although extension 97 may be placed proximate to the roof 37, lack of contact with the roof 37 may be advantageous in that the extension 97 need not be precisely positioned with respect to the roof 37 in order to provide protection from water running off the roof 37, thereby allowing for easier installation and greater manufacturing tolerances, either of which should reduce cost. Further, by not having the extension 97 in contact with the roof 37, a reduction in noise may be realized.

Figure 31:
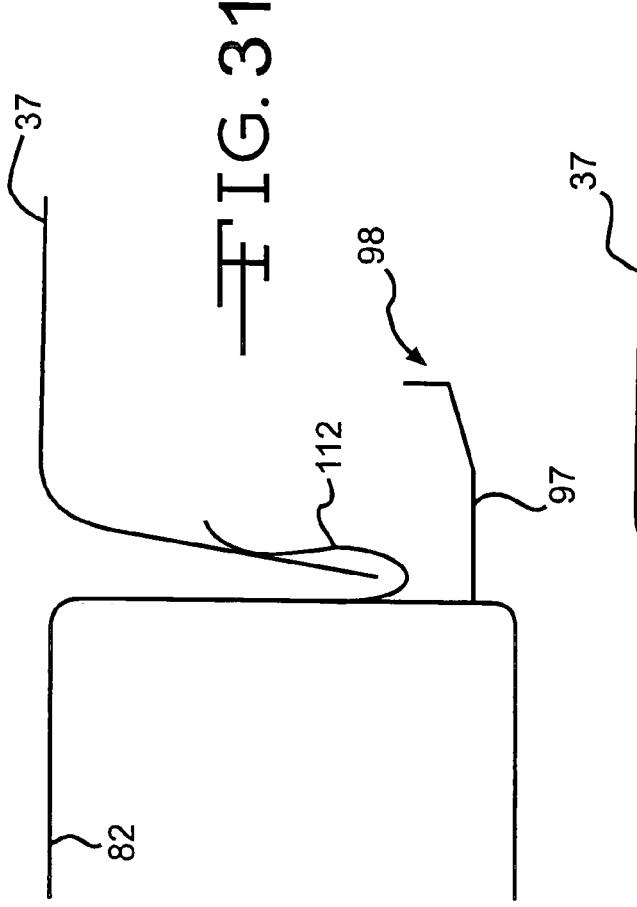
FIG. 31 shows a housing, which has an extension, according to the invention.
Figure 32:
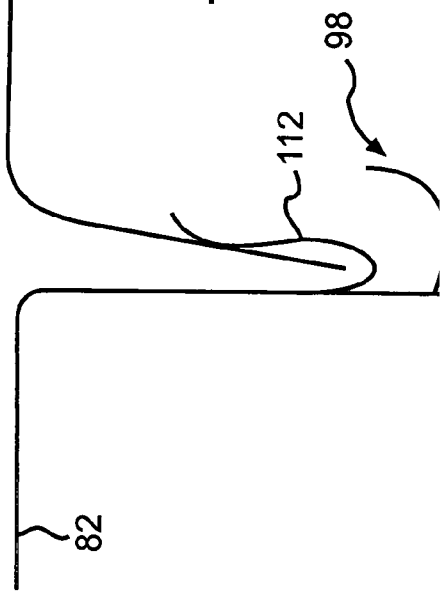
FIG. 32 shows a housing, which has an extension, according to the invention.

FIGS. 31 through 34 show an extension 97 in which an end distal from the housing 82 extends upward toward the roof 37 to prevent water from leaving the extension 97 and falling into the storage area 55 or onto the passengers riding in the cart. In this manner, a distal end 98 of the extension 97 is at a higher elevation than an end of the extension 97 which is joined to the housing 82. FIG. 31 shows that one or more substantially planar sections may be used to extend the extension 97 toward the roof 37. FIG. 32 shows an embodiment in which the extension 97 curves toward the roof 37. FIG. 33 shows an embodiment in which the extension 97 has a distal end 98 that is substantially planar. FIG. 34 shows an embodiment of the extension 97 in which the radius of curvature changes. In FIG. 34, the distal end 98 of the extension 97 has a smaller radius of curvature than other portions of the extension 97.

FIGS. 24A, 28 and 31 through 35 show embodiments of the housing 82 in which the housing 82 is attached to the roof 37 of the cart 10 by one or more hooks 112. The hooks 112 may engage a lip on the roof 37 to help attach the housing 82 to the roof 37.

A method according to the invention may result in covering a portion of a vehicle, such as a golf cart. FIG. 36 outlines a method according to the invention. Such a method may provide 200 a first support member which is pivotable about a first axis, and provide 203 a second support member which is pivotable about a second axis. The first axis may be different from the second axis. A canopy may be provided 206 and supported from at least one of the support members. At least one of the support members may be provided so as to pivot the support member about an axis from a first position in which the support member is in a nesting relationship with the other support member, to a deployed position in which the canopy is extended over a portion of the vehicle. The method may include a further step in which a housing is provided 209, wherein the housing has an opening through which at least a portion of the canopy, or at least a portion of a support member, or both, moves when the support member moves from the first position to the second position.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A canopy system for a cart, comprising:
   a first support member having a first end and a second end, the first end being pivotally supported from the cart and being pivotable about a first axis;
   a second support member having a first end and a second end, the first end being pivotally supported from the cart and being pivotable about a second axis, the second axis being different from the first axis;
   a stepped bracket having a first hole therethrough and a second hole therethrough;
   a first pivot pin extending through the first hole, and extending through the first end of the first support member;
   a second pivot pin extending though the second hole, and extending through the first end of the second support member; and
   a canopy supported from at least one of the support members, wherein when the canopy is not in a deployed position, the first support member and the second support member are in a nesting relationship.

2. The system of claim 1, wherein the first support member has a first set of dimensions and the second support member has a second set of dimensions, wherein the first set of dimensions is such that at least a portion of the first support member will nest within the second support member when the canopy is not in a deployed position.

3. The system of claim 1, wherein the first axis and the second axis are positioned so middle portions of the support members will nest with each other when the canopy is not deployed.

4. The system of claim 1, further comprising a housing having an opening through which the canopy may extend whenthe canopy id deployed.

5. The system of claim 4, further comprising an extention attached to the housing and extending from the housing and positioned to catch water running from a roof of the cart.

6. The system of claim 5, wherein the extension has a distal end that is at a higher elevation than an end of the extension which is joined to the housing.

7. The system of claim 4, wherein the housing is supported from the cart.

8. The system of claim 4, wherein the bracket is supported from the housing.

9. The system of claim 1, further comprising a housing having an opening through which at least part of at least one of the support members may travel when the canopy is moved from a deployed position to a stored position.

10. The system of claim 9, further comprising an extension attached to the housing and extending from the housing and positioned to catch water funning from a roof of the cart.

11. The system of claim 10, wherein the extension has a distal end that is at a higher elevation than an end of the extension which is joined to the housing.

12. The system of claim 9, wherein the housing is supported from the cart.

13. The system of claim 9, wherein the bracket is supported from the housing.

14. The system of claim 1, wherein the first axis is further from a roof of the cart than the second axis.

15. The system of claim 1, wherein the first end of the first support member resides at a first location that appears to be between roof supports of the cart when a viewer is looking at a rear of the cart, and the first end of the second support member resides at a second location that appears not to be between the roof supports when a viewer is looking at the rear of the cart.

16. A canopy system for a cart, comprising:
    a first support member having a first end and a second end, the first end being pivotally supported from the cart and being pivotable about a first axis;
    a second support member having a first end and a second end, the first end being pivotally supported from the cart and being pivotable about a second axis, the second axis being different from the first axis;
    a stepped bracket supported from the cart and providing a first location used to pivotally attach to the first end of the first support member; and
    a canopy supported from at least one of the support members, wherein when the canopy is not in a deployed position, the first support member and the second support member are in a nesting relationship.

17. The system of claim 16, wherein the bracket is supported from a roof support of the cart.

18. The system of claim 16, wherein the bracket also provides a second location used to pivotally attach to the first end of the second support member.

19. The system of claim 16, wherein the first support member has a first set of dimensions and the second support member has a second set of dimensions, wherein the first set of dimensions is such that at least a portion of the first support member will nest within the second support member when the canopy is not in a deployed position.

20. The system of claim 16, wherein the first axis and the second axis are positioned so middle portions of the support members will nest with each other when the canopy is not deployed.

21. The system of claim 16, further comprising a housing having an opening through which the canopy may extend when the canopy is deployed.

22. The system of claim 21, fUrther comprising an extension attached to the housing and extending from the housing and positioned to catch water running from a roof of the cart.

23. The system of claim 22, wherein the extension has a distal end that is at a higher elevation than an end of the extension which is joined to the housing.

24. The system of claim 21, wherein the housing is supported from the cart.

25. The system of claim 16, further comprising a housing having an opening through which at least part of at least one of the support members may travel when the canopy is moved from a deployed position to a stored position.

26. The system of claim 25, further comprising an extension attached to the housing and extending from the housing and positioned to catch water running from a roof of the cart.

27. The system of claim 26, wherein the extension has a distal end that is at a higher elevation than an end of the extension which is joined to the housing.

28. The system of claim 26, wherein the housing is supported from the cart.

29. The system of claim 16, wherein the first axis is farther from a roof of the cart than the second axis.

30. The system of claim 16, wherein the first end of the first support member resides at a first location that appears to be between roof supports of the cart when a viewer is looking at a rear of the cart, and the first end of the second support member resides at a second location that appears not to be between the roof supports when a viewer is looking at the rear of the cart.

31. The system of claim 4, farther comprising a hook extending from the housing for engaging a roof of the cart.

32. The system of claim 22, further comprising a hook extending from the housing for engaging a roof of the cart.

* * * * *